United States Patent [19]

Egner-Walter et al.

[11] Patent Number: 5,186,606
[45] Date of Patent: Feb. 16, 1993

[54] DOUBLE FEED PUMP, IN PARTICULAR FOR WINDSHIELD WASHER SYSTEMS IN MOTOR VEHICLES

[75] Inventors: Bruno Egner-Walter, Heilbronn; Eberhard Pleiss, Lauf, both of Fed. Rep. of Germany

[73] Assignee: SWF Auto-Electric GmbH, Fed. Rep. of Germany

[21] Appl. No.: 635,161
[22] PCT Filed: Apr. 25, 1990
[86] PCT No.: PCT/EP90/00665
  § 371 Date: Jan. 31, 1991
  § 102(e) Date: Jan. 31, 1991
[87] PCT Pub. No.: WO90/13460
  PCT Pub. Date: Nov. 15, 1990

[30] Foreign Application Priority Data

Apr. 29, 1989 [DE] Fed. Rep. of Germany ....... 3914228

[51] Int. Cl.⁵ ............................................... F01D 1/30
[52] U.S. Cl. .................. 415/152.1; 415/911; 417/442
[58] Field of Search .......... 415/146, 152.1, 152.2, 415/911; 417/442

[56] References Cited

U.S. PATENT DOCUMENTS

| 3,851,993 | 12/1974 | Foster | 415/911 |
| 4,728,260 | 3/1988 | Ishii | 415/152.1 |
| 4,874,298 | 10/1989 | Mainardi et al. | 415/911 |
| 4,900,235 | 2/1990 | Perkins et al. | 415/146 |

FOREIGN PATENT DOCUMENTS

| 128446 | 12/1984 | European Pat. Off. . |
| 0234802 | 9/1987 | European Pat. Off. . |
| 3430653 | 3/1986 | Fed. Rep. of Germany . |
| 8620253 | 9/1986 | Fed. Rep. of Germany . |
| 3729025 | 3/1989 | Fed. Rep. of Germany . |
| 2199080 | 6/1988 | United Kingdom ............. 415/152.1 |
| 2202133 | 9/1988 | United Kingdom . |

Primary Examiner—Edward K. Look
Assistant Examiner—Christopher Verdier
Attorney, Agent, or Firm—Robert P. Seitter; J. Gordon Lewis

[57] ABSTRACT

A double feed pump has two outlet channels to be selectively acted upon with liquid in accordance with the direction of rotation of a feed element and two movable sealing membranes one each being assigned to an outlet channel and separating a valve chamber into a front compartment with valve seat and into a rear compartment, whereby one front compartment each of one valve chamber and one rear compartment of the other valve chamber are connected by a pressure channel. In order to facilitate the manufacture of the parts the sealing membranes are arranged one beside the other in a parting plane of a two-part housing and in each housing half are positioned, assigned to one sealing membrane, an outlet channel and a front compartment with valve seat, and, assigned to the other sealing membrane, a rear compartment and a pressure channel between the front and rear compartments.

27 Claims, 7 Drawing Sheets

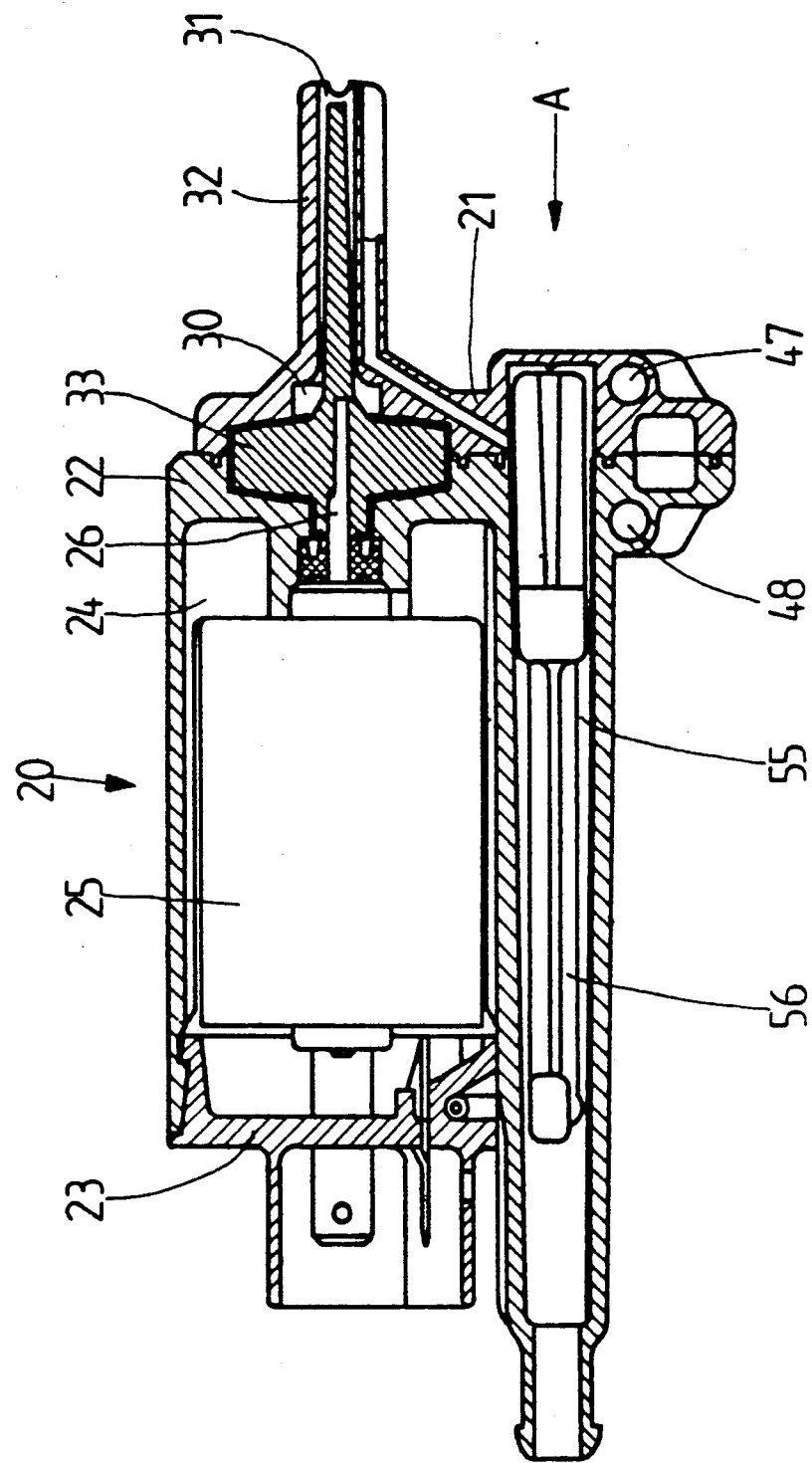

2

DOUBLE FEED PUMP, IN PARTICULAR FOR WINDSHIELD WASHER SYSTEMS IN MOTOR VEHICLES

INTRODUCTION

The present invention relates to a double feed pump which can be used as a pump for windshield washer systems in motor vehicles.

BACKGROUND OF THE INVENTION

From the German laid open print 35 32 580 (FIGS. 6 and 7), a pump of this kind is known which, in dependence on the direction of rotation, delivers washing liquid either to washing places on the windshield or to washing places on the headlamp lenses of a motor vehicle. Such a pump includes two housing parts. Two outlet channels, two valves seats, two delivery chambers of sealing membranes and two pressure channels are positioned in one of the housing parts, which consequently has a complicated construction and can only be manufactured with difficulty.

The invention is therefore based on the problem of developing a double feed pump which has a simple construction and can be manufactured easily.

BRIEF DESCRIPTION OF THE INVENTION

The foregoing problem is solved according to the invention through provision of a double feed pump, in which the sealing membranes are arranged in a parting plane of a two-part housing and each housing part accommodates an outlet channel and a front compartment with valve seat assigned to one sealing membrane, a rear compartment assigned to the other sealing membrane and a pressure channel between the front and the rear compartments. Thus, the water carrying compartments and channels of a double feed pump according to the invention are uniformly distributed on both portions of a two-part housing in the parting plane where the sealing membranes are arranged. For this reason, the two housing portions can have a relatively simple shape, and can be manufactured easily.

So-called rotary pumps are typically used as feed pumps for washing liquid in motor vehicles, in which pumps an impeller is driven by an electric motor, wherein the impeller takes in the liquid through a central connection piece and, as far as a double feed pump is concerned, presses it into two delivery channels branched off from the delivery chamber. In dependence on the direction of rotation of the impeller, the pressure in one delivery channel is higher than in the other delivery channel or vice versa. According to one configuration, at least one of the two delivery channels opens into the front compartment assigned to a sealing membrane. According to another configuration, at least one of the two delivery channels can also open into the rear compartment assigned to a sealing membrane. Thereby, an embodiment is preferred in which according to claim 5 one delivery channel is positioned in one housing half and the other delivery channel in the other housing half.

The construction is especially simple and involves little sealing problems, if an outlet channel serves as a pressure channel. The outlet channel, branched off from the front compartment of one sealing membrane, extends preferably in a direction towards the second sealing membrane and is open there towards the rear compartment of the second sealing membrane.

The shape of a housing half is also simple, if a pressure channel is formed as a duct which is open towards the parting plane of the housing half. If both pressure channels are developed as ducts open towards the parting plane, they can be laterally set off for being sealed reciprocally.

A pressure channel can also be branched off from a delivery channel.

Handling and mounting of the two sealing membranes is simplified in that the latter are integrally connected with each other through a transition piece. If the two pressure channels intersect entirely or partially, the transition piece interconnecting the two sealing membranes can simultaneously be used for separating the two pressure channels from each other.

The sealing membranes, the compartments, the delivery channels and the outlet channels can be arranged axially symmetrically in pairs. Consequently in one direction of rotation of the pump the pressure conditions on one membrane are the same as in the other direction of rotation of the pump on the other membrane. Modification of the channels with regard to the two sealing membranes can provide different pressure conditions on the two sealing membranes.

It can be favorable when the two delivery channels are branched off from the delivery chamber at about the same level. In order to prevent the delivery channels from having to extend slantingly it is suitable, if the two delivery channels open into two compartments on the sealing membranes in at least substantially the same plane. If the two delivery channels are intended to open into a front compartment or into a rear compartment, the two sealing membranes are advantageously set off relative to each other in a direction perpendicularly standing on them in such a way that the two front compartments or the two rear compartments are at least substantially positioned at the same level. In this case a step or a slope can be positioned in the two housing halves between the sealing membranes.

BRIEF DESCRIPTION OF THE DRAWINGS

Several embodiments of a double feed pump according to the invention are shown in the accompanying drawings. The invention will now be described in detail by way of the Figures of these drawings, in which:

FIG. 1, is a longitudinal section through the first embodiment;

Figure 3:
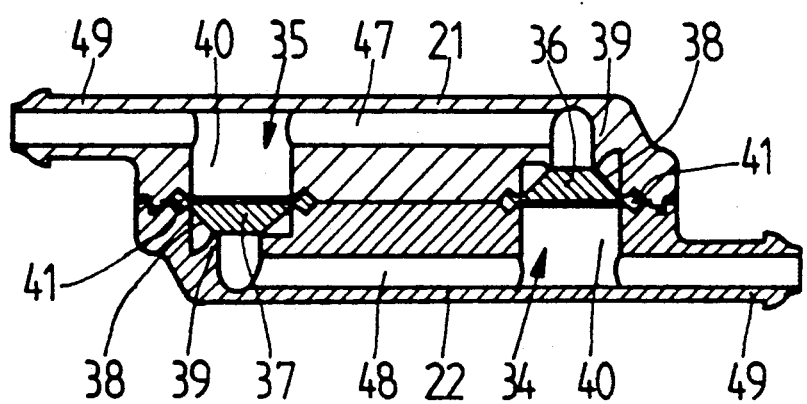
FIG. 3, is a section taken on the line III—III of FIG. 2.
Figure 2:
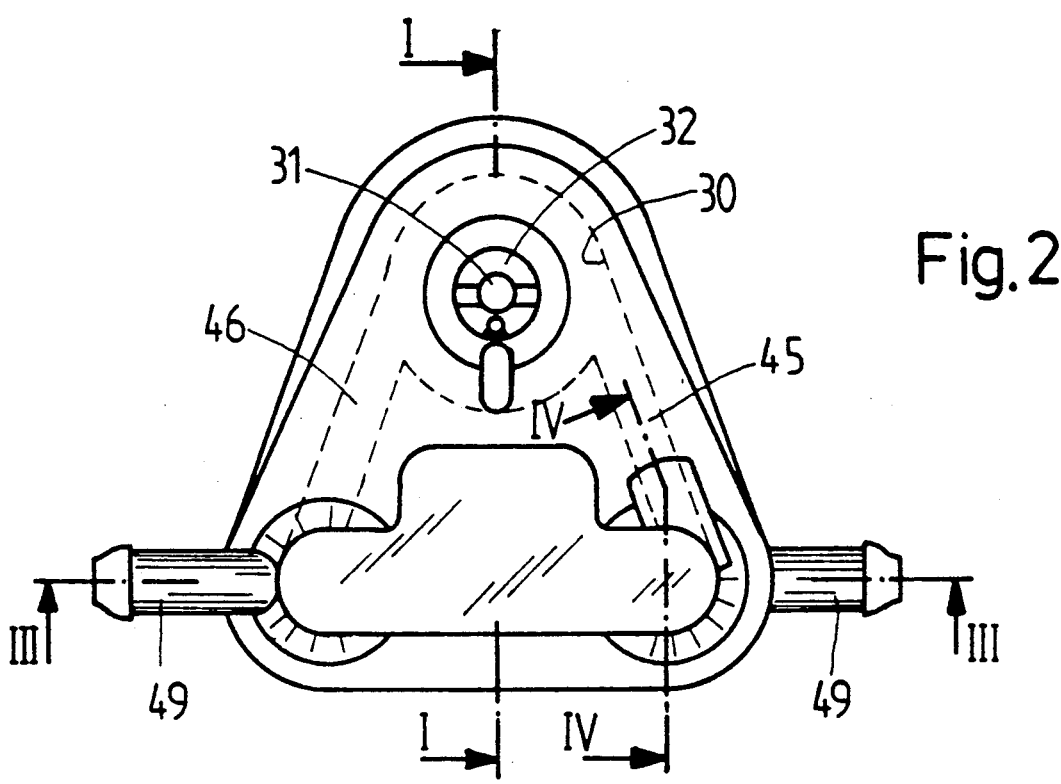
FIG. 2, is a view of the pump according to FIG. 1 in the direction of arrow A.

DETAILED DESCRIPTION OF THE PREFERRED AND ALTERNATIVE EMBODIMENTS OF THE INVENTION

Referring to FIG. 1, a housing 20 of a washing fluid pump for the windshield washer system of a motor vehicle has a plate-shaped bottom 21 and a cup-shaped top 22 closed by a cover 23 on the side opposite to the bottom 21. A small electric motor 25 is inserted in a hollow-cylindrical recess 24 of the top 22, which motor projects with its motor shaft 26 through the bottom of the top 22 into a delivery chamber 30 formed by bottom 21 and top 22. An intake channel 31 opens centrally into the delivery chamber, which intake channel extends through an intake connection piece 32 integrally formed onto the bottom 21. In the delivery chamber 30 is accommodated an impeller 33 secured onto the motor shaft 26 in a manner protected against twisting.

Referring to FIGS. 2 through 5, bottom 21 and top 22 form together two valve chambers 34 and 35 positioned one beside the other laterally of the delivery chamber 30 and in a plane perpendicular to the axis of the delivery chamber. Each valve chamber is divided into a front compartment 38 with a valve seat 39 and a rear compartment 40 by a sealing membrane 36 or 37, the front compartment 38 and the rear compartment 40 being positioned one behind the other in direction of the axis of the delivery chamber 30. In the rest condition of the pump, the sealing membranes 36 and 37 rest against the valve seats 39 because of an internal prestress.

Figure 4:
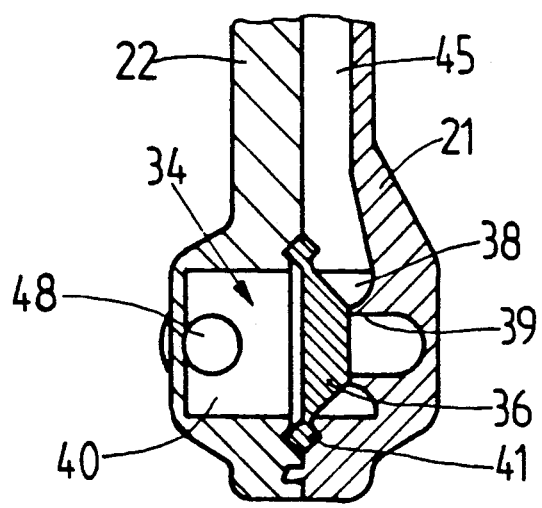
FIG. 4, is section taken on the line IV—IV of FIG. 2.
Figure 5:
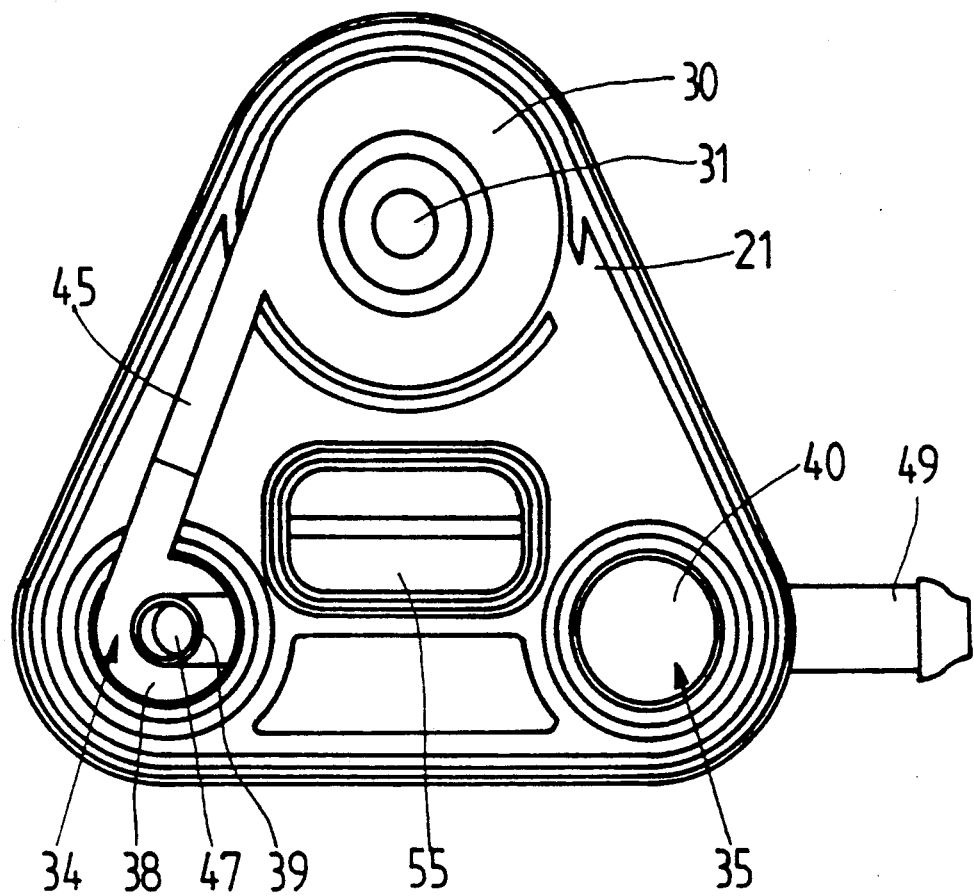
FIG. 5, is an interior view of one housing portion.

FIGS. 3 and 4 illustrate that the sealing membranes 36 and 37 are braced between bottom 21 and top 22 of the housing 20 by an annular ring 41, so that they are arranged one beside the other in the parting plane of a two-part housing. From FIG. 3 can furthermore be seen that the front compartment 38 of the valve chamber 34 and the rear compartment 40 of the valve chamber 35 are positioned in the bottom 21, the front compartment 38 of the valve chamber 35 and the rear compartment 40 of the valve chamber 34 in the top 22 of the housing, all portions being open towards the parting plane between bottom and top.

From the delivery chamber 30 are branched off two straight-lined delivery channels 45 and 46 at two different levels and tangentially extending into opposite directions, of which the delivery channel 45 extends in the bottom 21 and opens into the front compartment 38 of the valve chamber 34 and the delivery channel 46 extends in the top 22 and opens into the front compartment of the valve chamber 35. Both delivery channels 45 and 46 are open towards the parting plane of the respective part 21 or 22 and, as can be seen from FIG. 4 for channel 45, they are covered during the assembly by bottom 21 and top 22.

A straight-lined outlet channel 47 or 48 each is branched off from a valve seat 39, thus from a front compartment 38 of a valve chamber 34 or 35. This outlet channel extends with a spacing from the parting plane between bottom 21 and top 22 and in parallel to the parting plane from one valve chamber in a direction towards the other valve chamber and extends beyond the other valve chamber by a connection piece 49. Thus an outlet channel 47 or 48 belongs to each housing half 21 and 22. The outlet channel 47 is open towards the rear compartment 40 of the valve chamber 35 and the outlet channel 48 is open towards the rear compartment of the valve chamber 34, and the rear compartments are so deep that they completely interrupt the channels 47 or 48. Thus the channels 47 and 48 open into the rear compartments and begin again beyond the area of the opening.

When the electric motor 25 is switched off the sealing membranes 36 and 37 rest against the valve seats 39 and thereby prevent the outlet channels from being discharged into the washing liquid receptacle or to prevent the washing liquid receptacle from being emptied through a washing place positioned at a lower level than itself. When the electric motor 25 is switched on, pressures of different height are existing in the two delivery channels 45 and 46 which would both be high enough to lift off the sealing membranes 36 and 37 from the valve seats 39. The higher pressure for example existing in the delivery channel 45, by which the sealing membrane 36 is lifted off from its valve seat 39, is however transmitted to the rear compartment 40 of the valve chamber 35 through the outlet channel 47 and there acts upon the sealing membrane 37 against the lower pressure of the delivery channel 46 existing in the front compartment 38 of the valve chamber 35. The sealing membrane 37 is thus held on its valve seat 39. No washing liquid is thus delivered through the outlet channel 48. In addition the sealing membrane 37 is reliably kept in closed condition in that its surface exposed to the closing pressure existing in the rear compartment 40 is larger than its surface exposed to the lower opening pressure existing in the front compartment. The opening pressure can indeed not act upon the surface enclosed by the valve seat 39.

If the electric motor 25 is connected to voltage with reversed polarities, the impeller 33 rotates in the opposite direction and the pressure in the delivery channel 46 is higher than in the delivery channel 45. Now the washing liquid is only delivered through the outlet channel 48.

In the pump according to FIG. 1 to 5 a float chamber 55 is also formed by bottom 21 and top 22, in which chamber a float 56 of a liquid level sensor for the washing liquid can move. The float chamber extends alongside the recess 24 for the electric motor 25 and is located in the areas of the bottom 21 and of the bottom of the top 22 it is located in the space between delivery chamber 30 and the two valve chambers 34 and 35 which can be recognized as arranged in the corners of a triangle as can be clearly seen from FIG. 5. In this manner only little additional space is required for the float chamber 55.

Figure 6:
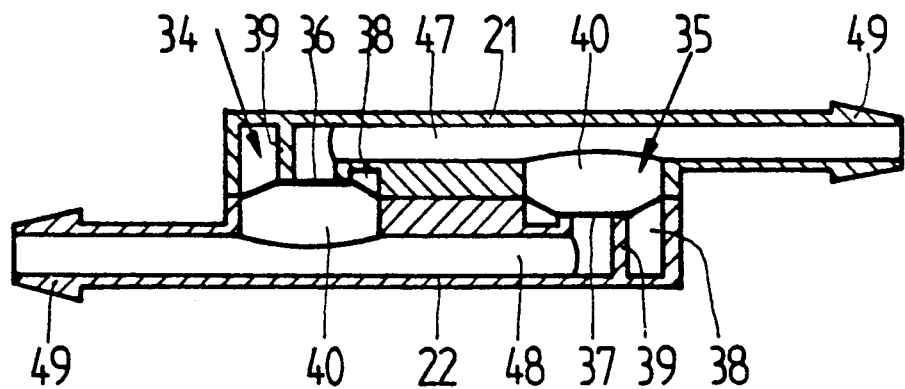
FIG. 6, is a second embodiment in a section corresponding to that of FIG. 3, in which the rear compartments assigned to the sealing membranes only cut the outlet channels tangentially.

The construction of the embodiment according to FIG. 6 corresponds to a far-reaching extent to that of the feed pump just described. In contrast to the embodiment according to FIGS. 1 to 5 the height of the rear compartments 40 of the valve chambers 34 and 35 is reduced, so that these portions only tangentially cut the outlet channels 47 and 48 at a level corresponding to approximately half of the radius of an outlet channel. The cross-section of the outlet channels 47 and 48 are thus to a far-reaching extent also retained in the area of the rear compartments 40, so that the washing liquid also streams laminarly there.

Figure 7:
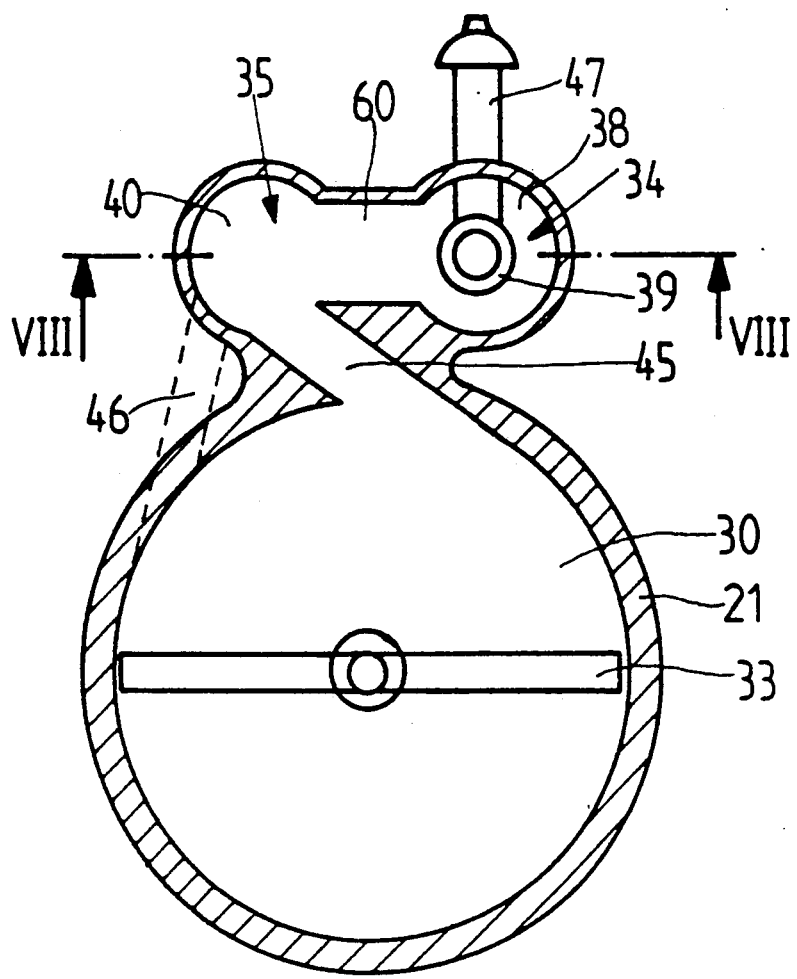
FIG. 7, is an interior view of one housing portion of a third embodiment, in which an outlet channel serves as a pressure channel and an additional pressure channel is also available.
Figure 8:
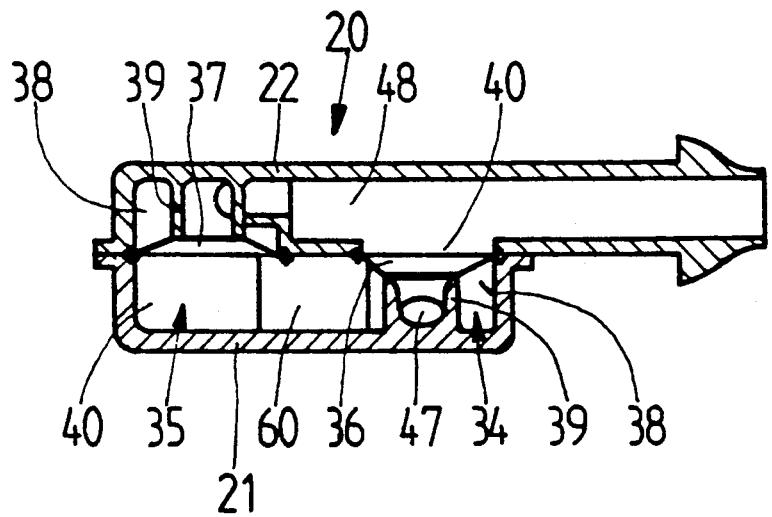
FIG. 8, is a section taken on the line VIII—VIII of FIG. 7.

Whereas in the two embodiments described up to now, delivery channels, pressure channels and outlet channels are arranged in the same way relative to the two sealing membranes, FIGS. 7 and 8 show an embodiment in which the arrangement with regard to one sealing membrane is different from that with regard to the other sealing membrane. The housing 20 of this embodiment has also a bottom 21 and a top 22 between which the two sealing membranes 36 and 37 are braced which, when the pump is switched off, rest against the valve seats 39 because of an internal prestress. In a direction towards the sealing membrane 36 an outlet channel 48 is branched off in parallel to the parting plane between bottom 21 and top 22 from the front compartment 38 of the valve chamber 35 formed in the top 22 in a similar way as in the two embodiments described above. This outlet channel is open towards the rear compartment 40 of the valve chamber 34 in which the sealing membrane 36 is positioned. Thus the outlet channel 48 serves as a pressure channel between the front compartment 38 of the valve chamber 35 and the rear compartment 40 of the valve chamber 34. Thus with regard to the top 22 the embodiment according to FIGS. 7 and 8 is still in line with the embodiments according to FIGS. 1 to 6.

Now the outlet chamber 47 in the bottom 21 does not extend in a direction towards the valve chamber 35, but is rather branched off from the valve seat 39 perpendicularly to this direction and perpendicularly to the outlet channel 48.

Independently of the outlet channel 47 the front compartment 38 of the valve chamber 34 and the rear compartment 40 of the valve chamber 35 are interconnected by a pressure channel 60 entirely positioned in the bottom 21, open towards the parting plane between bottom 21 and top 22 and closed by the top 22 when the two parts have been assembled.

From FIG. 7 can be recognized that not only the pressure channels, but also the delivery channels 45 and 46 branched off from the delivery chamber 30 are in a different way arranged relative to the two sealing membranes 36 and 37. The delivery channel 45 located in the bottom 21 opens into the rear compartment 40 of the valve chamber 35. The delivery channel 46, entirely positioned in the top 22 and therefore in FIG. 7 only indicated by broken lines, opens into the front compartment 38 of the valve chamber 35.

If in the view according to FIG. 7 the impeller 33 is rotated in counter-clockwise direction, the pressure in the delivery channel 45 is higher than in the delivery channel 46. This higher pressure also exists in the rear compartment of the valve chamber 35 and holds the sealing membrane 37 on the valve seat 39 against the lower pressure in the front compartment 38. The pressure is transmitted into the front compartment 38 of the valve chamber 34 through the pressure channel 60 and lifts off the sealing membrane 36 from the valve seat 39. Thus washing liquid is delivered through the outlet channel 47.

In the opposite direction of rotation of the impeller 33 the higher pressure is available in the front compartment 38 of the valve chamber 35. The sealing membrane 37 is lifted off from the valve seat 39, so that water streams through the outlet channel 48 and the higher pressure in this channel holds the sealing membrane 36 on its valve seat 39. Because no pressure is available in the outlet channel 48, when the impeller is rotated in counter-clockwise direction, the sealing membrane 36 is in any case lifted off from the valve seat 39 in such a direction of rotation.

Figure 9:
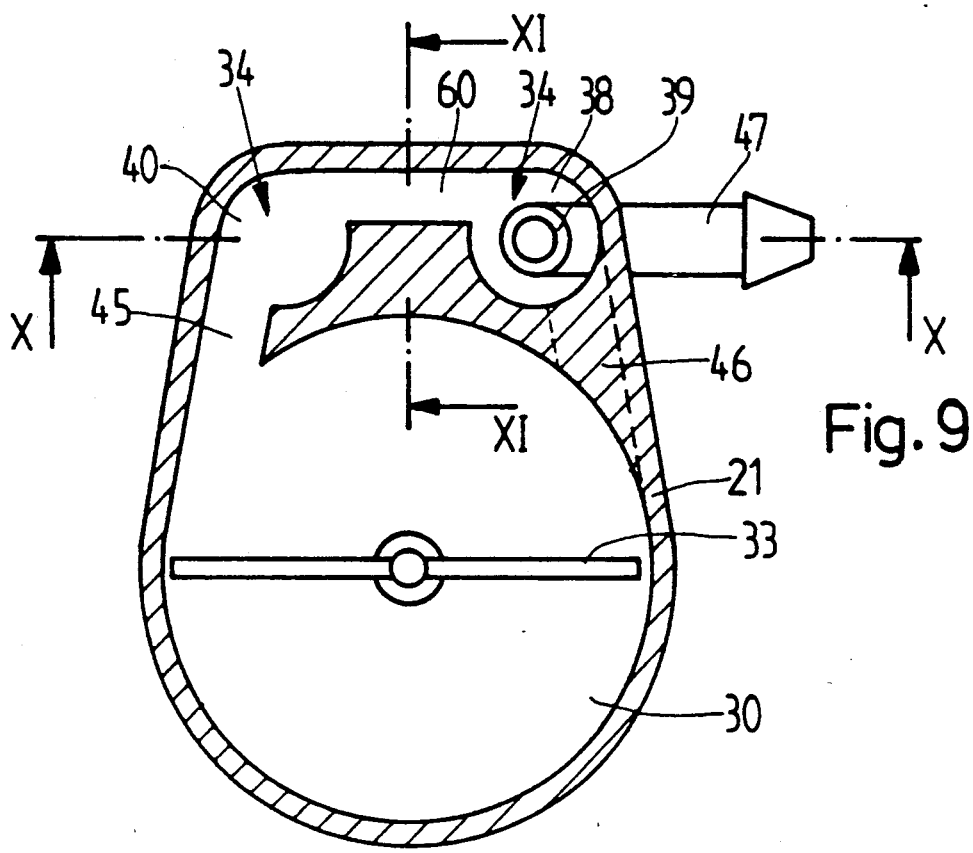
FIG. 9, is an interior view of one housing portion of a fourth embodiment, in which the rear and front compartments of the sealing membranes are interconnected via laterally set off pressure channels.
Figure 10:
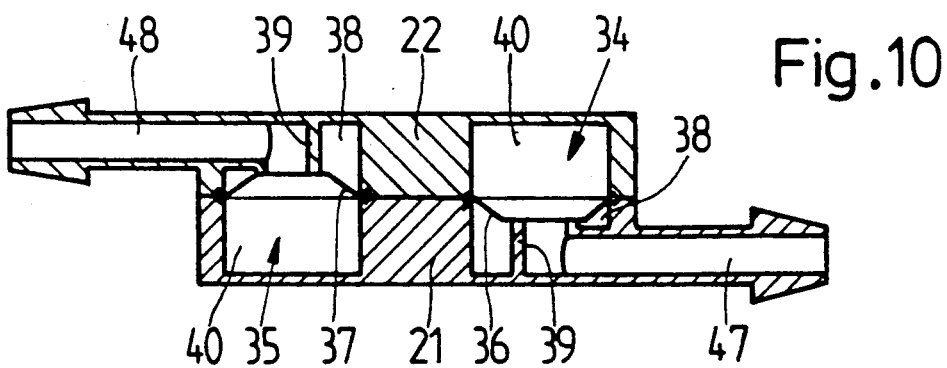
FIG. 10, is a section taken on the line X—X of FIG. 9.
Figure 11:
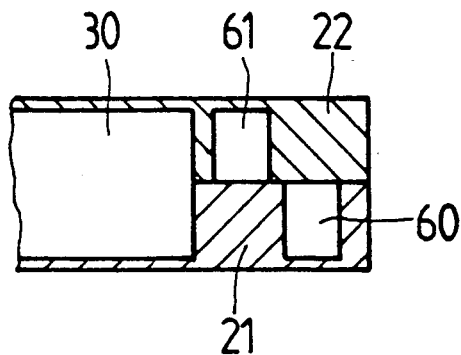
FIG. 11, is a section taken on the line XI—XI of FIG. 9.

In the embodiment according to FIGS. 9 to 11 the outlet channels 47 and 48 in the bottom 21 and in the top 22 project outwardly from the valve seats 39 from the respective side not facing the other valve chamber of the housing half concerned. The front compartment 38 of one valve chamber, which compartment is located in one housing half 21 or 22 and the rear compartment 40 of the other valve chamber, which compartment is positioned in this housing half are connected with each other by pressure channels 60 and 61 independently of the outlet channels 47 and 48. It is true that the said pressure channels are open towards the parting plane of the housing halves, but as can be clearly seen from FIG. 11, they are laterally set off towards each other in such a way that the pressure channel of one housing half is covered by the other housing half and that there is no connection between the pressure channels.

The delivery channel 45 in the bottom 21 is conducted from the delivery chamber 30 to the rear compartment 40 of the valve chamber 35 with the sealing membrane 37. The delivery channel 46 located in the top 22, in FIG. 9 only shown in broken lines, is conducted from the delivery chamber 30 into the rear compartment 40 of the valve chamber 34 with the sealing membrane 36. If according to the view of FIG. 9 the impeller 33 is rotated in counter-clockwise direction, a higher pressure is produced in the delivery channel 46 than in the delivery channel 45. The higher pressure is transmitted into the front compartment 38 of the valve chamber 35 through the rear compartment 40 of the valve chamber 34 and the pressure channel 61. The lower pressure of the delivery channel 45 exists also in the rear compartment 40 of the valve chamber 35, in the pressure channel 60 and in the front compartment of the valve chamber 34. Accordingly the sealing membrane 37 opens the outlet chamber 48, whereas the sealing membrane 36 keeps the outlet channel 47 in closed condition. If the impeller 33 is rotated in clockwise direction, it is just the other way around.

Figure 12:
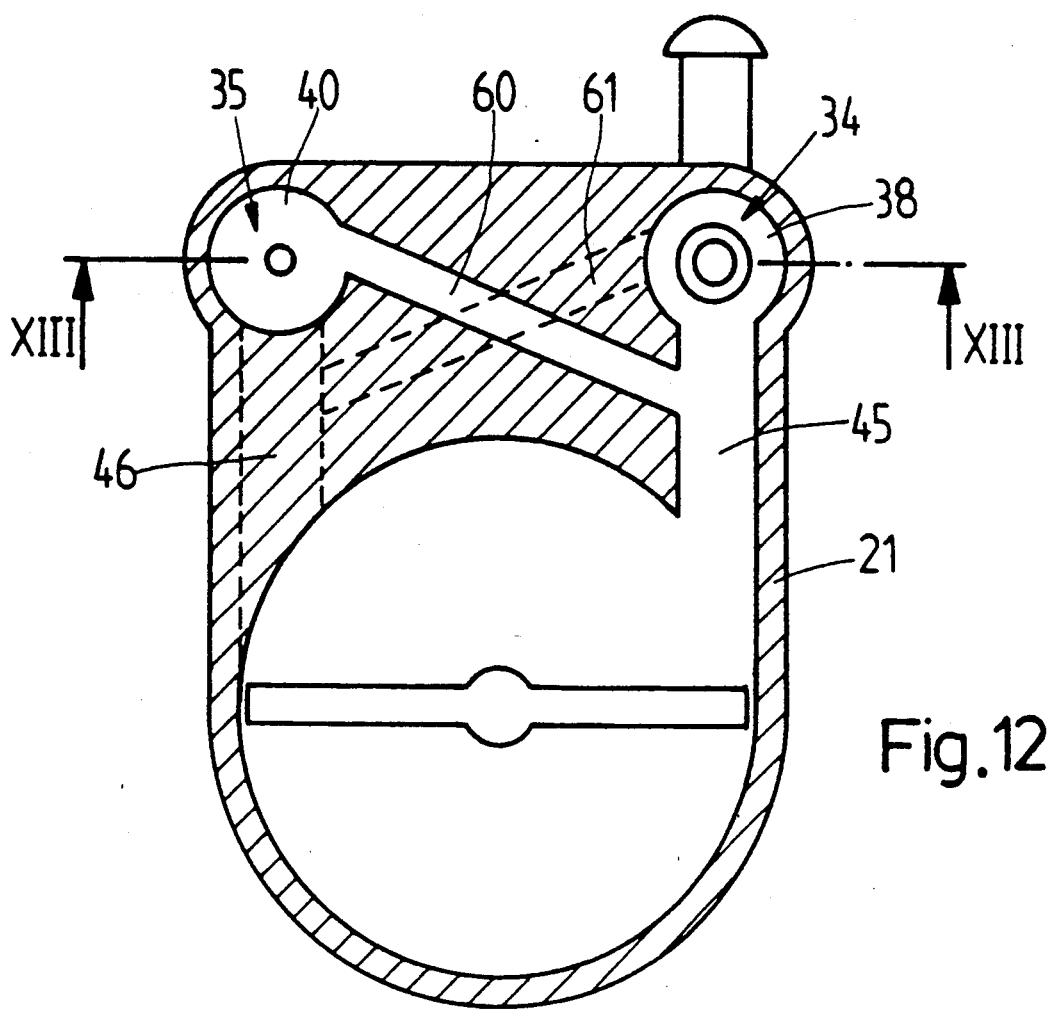
FIG. 12, is an interior view of one housing portion of a fifth embodiment, in which the pressure channels are branched off from the delivery channels, intersect and are separated from each other by a transition piece between the sealing membranes.
Figure 13:
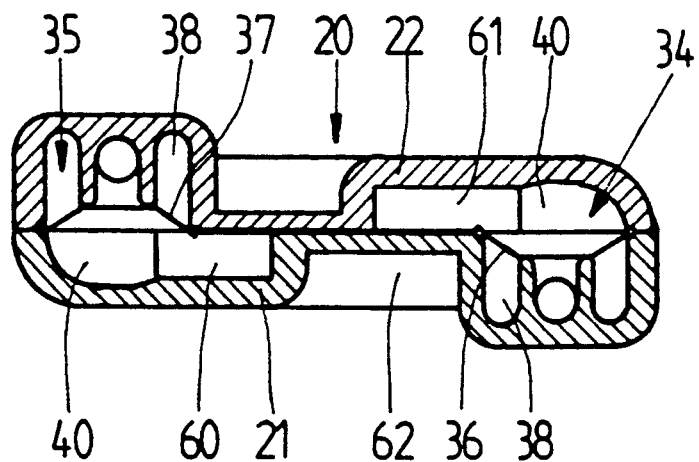
FIG. 13, is a section taken on the line XIII—XIII of FIG. 12.

In the embodiment according to FIGS. 12 and 13 the delivery channel 45 in the bottom 21 opens into the front compartment 38 of the valve chamber 34. The delivery channel 46, in FIG. 12 only indicated by broken lines, opens into the front compartment 38 of the valve chamber 35. From the delivery channel 45 a pressure channel 60 is branched off which in the bottom 21 is conducted to the rear compartment 40 of the valve chamber 35. The delivery channel 46 is connected with chamber 35. The delivery channel 46 is connected with the rear compartment of the valve chamber 34 through a pressure channel 61 of the top 22 in FIG. 12 also only shown in broken lines.

The two pressure channels 60 and 61 are open towards the parting plane of the two housing halves 21 and 22 and have therefore to be sealed relative to each other in the vicinity of their intersection. For this purpose the two sealing membranes 36 and 37 together with a transition piece 62 are combined to form a single structural unit. After the assembly the transition piece is positioned between bottom 21 and top 22 of the housing 20 and separates the two intersecting pressure channels 60 and 61 from each other.

Figure 14:
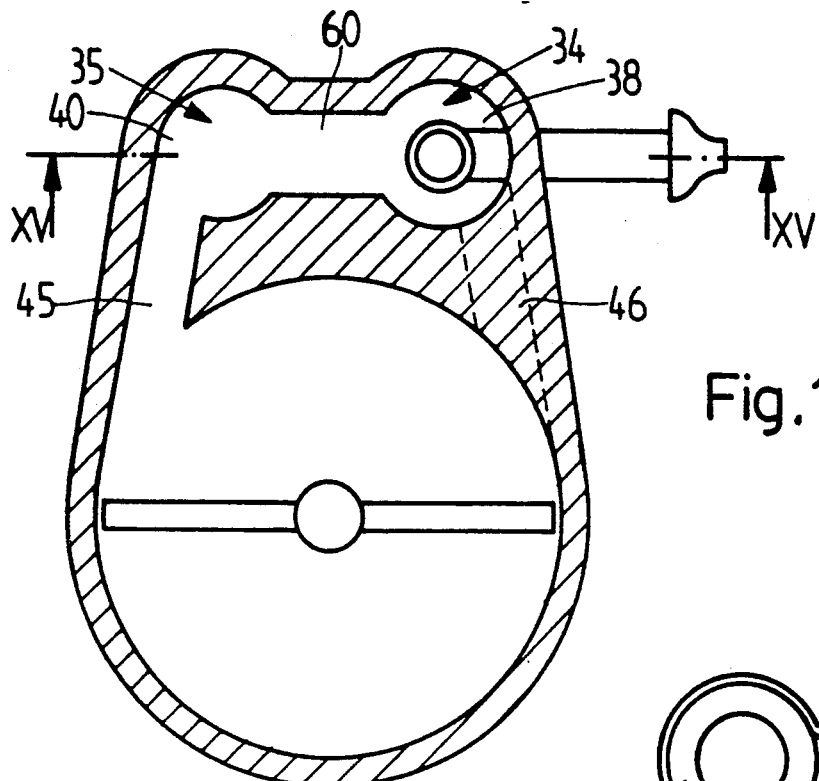
FIG. 14, is an interior view of one housing portion of a sixth embodiment, in which the superimposed pressure channels are separated from each other by a transition piece between the two sealing membranes.
Figure 16:
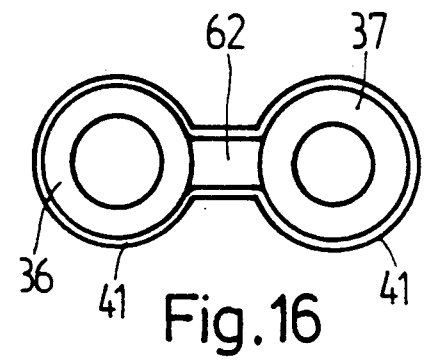
FIG. 16, is a view of the two sealing membranes of the sixth embodiment formed in one piece with a transition piece.
Figure 15:
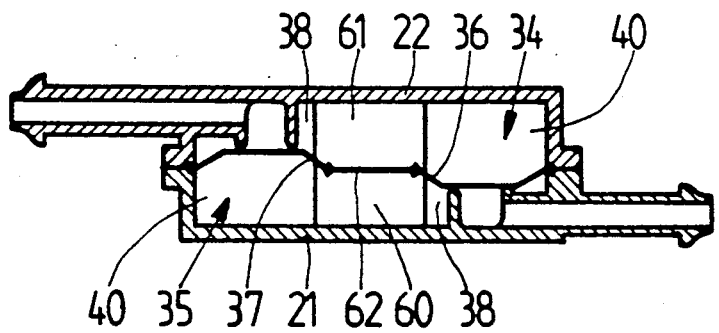
FIG. 15, is a section taken on the line XV—XV of FIG. 14.

FIGS. 14 to 15 shown an embodiment which is very similar to that of FIGS. 9 to 11. The delivery channels 45 and 46 in the bottom 21 or in the top 22 respectively open into the rear compartments 40 of the valve chambers 34 and 35. The rear compartment 40 of the valve chamber 35 is connected with the front compartment 38 of the valve chamber 34 through a pressure channel 60 and the rear compartment of the valve chamber 34 with the front compartment 38 of the valve chamber 35 through a pressure channel 61. The two pressure channels 60 and 61, both open towards the parting plane of the two housing halves 21 and 22, are now not laterally set off in this case in contrast to the embodiment according to FIGS. 9 to 11, but extend exactly one upon the other. A transition piece 62 between the two sealing membranes 36 and 37 connects them to form a single structural unit and separates the two pressure channels 60 and 61 from each other after the assembly.

The two sealing membranes 36 and 37 of the embodiments so far described are located in a common plane with their annular ring 41. Looking in the axial direction of delivery chamber 30 and valve chambers 34 and 35 the delivery channels 45 and 46 are branched off from the delivery chamber 30 at different levels and open into the valve chambers 34 and 35 at different levels.

Figure 17:
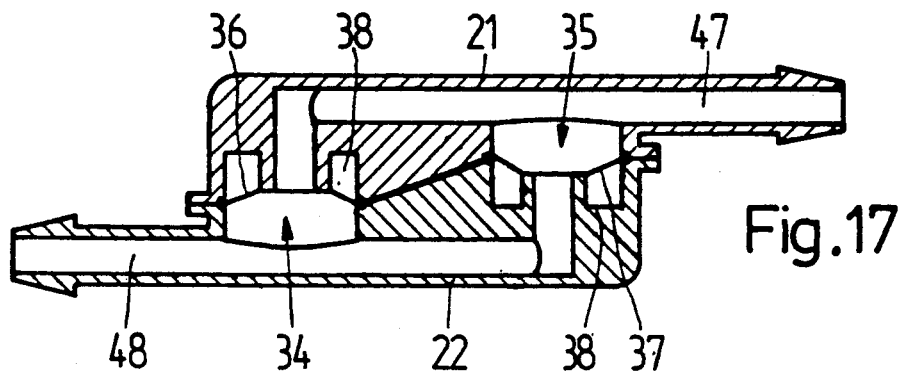
FIG. 17, is a seventh embodiment in a section similar to that of FIG. 3, in which the two sealing membranes are set off relative to each other in a direction perpendicular to themselves.

In the embodiment according to FIG. 17, in which once again the outlet channels 47 and 48 are used as pressure channels, the two valve chambers 34 and 35 and the sealing membranes 36 and 37 positioned therein are in the axial direction set off relative to each other in such a way that the front compartments 38 of the two valve chambers are positioned at the same level. The parting plane between the two housing halves 21 and 22 passes over in a slope between the two valve chambers 34 and 35 to the various levels. A stepped transition can also be conceived, however in this case it is much more difficult to provide a dense connection of the two housing halves, for example effected by ultrasonic welding. The two delivery channels 45 and 46 not shown in detail in FIG. 17 now open at the same level into the front compartments 38 of the valve chambers 34 and 35 and can therefore also be branched off from the delivery chamber 30 at the same level.

What is claimed is:

1. A double feed pump for a windshield washer system in a motor vehicle comprising:

first and second housing portions, each housing portion having an outlet channel, a front compartment with a valve seat, a rear compartment communicating with the outlet channel and a pressure channel communicating between the front compartment and the rear compartment, the first and second housing portions engageable along a parting plane to operably dispose the front compartment of one housing portion in communication with the respective rear compartment of the other housing portion to define first and second valve chambers;

two moveable sealing membranes disposed between the first and second housing portions along the parting plane, one sealing membrane disposed between each front compartment and respective rear compartment of the first and second valve chambers, respectively; and a feed element disposed in a delivery chamber and selectively rotatable in clockwise and counter-clockwise directions to selectively deliver fluid at a first pressure to one of the valve chambers while simultaneously delivering fluid at a second lower pressure to the other of the valve chambers.

2. A double feed pump according to claim 1, wherein at least one of the valve seats is positioned on one of the outlet channels.

3. A double feed pump according to claim 1, wherein at least one of two delivery channels opens into one of the front compartments, the one delivery channel branched off from said delivery chamber.

4. A double feed pump according to claim 1, wherein at least one of two delivery channels opens into one of the rear compartments, the one delivery channel branched off from said delivery chamber.

5. A double feed pump according to claim 4, wherein one delivery channel is positioned in one housing portion and the other delivery channel is positioned in the other housing portion.

6. A double feed pump according to claim 1, wherein one of the outlet channels also serves as one of the pressure channels.

7. A double feed pump according to claim 6, wherein the one outlet channel branches off from the front compartment of one valve chamber and, extends in a direction towards the second valve chamber, the one outlet channel open towards the rear compartment of the second valve chamber.

8. A double feed pump according to claim 7, wherein the rear compartment of the second valve chamber cuts the one outlet channel only tangentially.

9. A double feed pump according to claim 6, wherein the one outlet channel extends in parallel to said parting plane of the two housing portions.

10. A double feed pump according to claim 1, wherein at least one of the pressure channels is formed as a duct of one housing portion, which duct is open towards said parting plane of the two housing portions.

11. A double feed pump according to claim 10, where each pressure channel of the first and second housing portions is formed as a duct open toward the parting plane and the pressure channels are laterally set off relative to each other.

12. A double feed pump according to claim 1, wherein one of the pressure channels is branched off from said delivery chamber.

13. A double feed pump according to claim 1, wherein the two sealing membranes are integrally connected through a transition piece.

14. A double feed pump according to claim 13, wherein the two pressure channels intersect at least in sections and are separated from each other by the transition piece connecting the two sealing membranes with each other.

15. A double feed pump according to claim 1, wherein the two sealing membranes, the first and second valve chambers, the delivery chamber, the delivery channels and the outlet channels are axially symmetrically arranged in pairs.

16. A double feed pump according to claim 4, wherein an arrangement of channels and/or pressure channels and/or outlet at least one of the channels selected from a group of channels including the delivery channels, the pressure channels and the outlet channels with regard to one of the sealing membranes is different from that with regard to the other of the sealing membranes.

17. A double feed pump according to claim 16, wherein one of two delivery channels branched off from the delivery chamber opens into the front compartment and the other one of the two delivery channels opens into the rear compartment of the same valve chamber.

18. A double feed pump according to claim 16, wherein, through one of the outlet channels, the rear compartment of a first valve chamber and, through one of the pressure channels, the rear compartment of the second valve chamber are connected with the front compartment of the respective other valve chamber.

19. A double feed pump according to claim 4, wherein the two delivery channels branched off from the delivery chamber open into the front compartment of the respective housing portion in at least substantially the same plane.

20. A double feed pump according to claim 19, wherein the two sealing membranes set off in a direction standing perpendicularly on them selves in such a way that the two front compartments or the two rear compartments are at least substantially positioned at the same level and that the two delivery channels open into the portions positioned at the same level.

21. A double feed pump according to claim 1, wherein in the rest condition at least one of the two sealing membranes rests against the valve seat because of an internal prestress.

22. A double feed pump according to claim 21, wherein the surface of the sealing membrane exposed to the closing pressure is larger than the surface exposed to the opening pressure.

23. A double feed pump according to claim 3, wherein one delivery channel is positioned in one housing portion and the other delivery channel is positioned in the other housing portion.

24. A double feed pump comprising:
a housing assembly defining an inlet channel adapted for connection to a fluid source and two outlet channels adapted for connection to separate fluid dispensing elements, said housing assembly including two mating body portions defining a parting plane thereinbetween, two resilient valving elements sealingly partioning and subdividing first and second valve chambers into respective front and rear compartments opening into said parting plane, at least one pressure channel communicating between the front compartment of one valve chamber and the rear compartment of the other valve chamber, at least one valving element co-acting with a valve seat in an associated front compartment to modulate the flow of fluid therein to one of said outlet channels as a function of the fluid pressure across said valving element; and
pump means including a bi-directional rotary pumping element communicating with both said valve chambers to effect a discharge of fluid from one outlet channel when rotating in a first directional sense and a discharge of fluid from the other outlet channel when rotating in an opposite directional sense.

25. The double feed pump of claim 24, wherein said valving elements comprise generally annular membranes including a displaceable center portion disposed for selective abutting engagement with an associated valve seat and an outer circumferential portion restrained between said body portions.

26. The double feed pump of claim 24, wherein said valving elements are retained between said body portions substantially upon said parting plane.

27. A double feed pump comprising:
a housing assembly defining an inlet channel adapted for connection to a fluid source and two outlet channels adapted for connection to separate fluid dispensing elements, said housing assembly including two mating body portions defining a parting plane therebetween. Two resilient valving elements sealingly partitioning and subdividing first and second valve chambers into respective front and rear compartments opening into said parting plane, at least one valving element co-acting with a valve seat in an associated front compartment to modulate the flow of fluid therein to one of said outlet channels as a function of the fluid pressure across said valving element; and
pump means including a bi-directional rotary pumping element communicating with both said valve chambers to effect a discharge of fluid from one outlet channel when rotating in a first directional sense and a discharge of fluid from the other outlet channel when rotating in an opposite directional sense, wherein said pump means communicate with each front compartment through a delivery channel and each front compartment further communicates with the rear compartment of the other valve chamber through one of said outlet channels, communication between said delivery and outlet channels being modulated by said associated valving element and valve seat.

* * * * *